Aug. 25, 1964 K. H. RENSHAW 3,146,307

RECEIVER FOR DATA WITH ONE FREQUENCY INDICATING ONE BINARY LOGIC STATE AND ANOTHER FREQUENCY INDICATING OTHER STATE

Filed Nov. 7, 1961 2 Sheets-Sheet 1

INVENTOR.
KENNETH H. RENSHAW
BY Moody and Phillips
ATTORNEYS

INVENTOR.
KENNETH H. RENSHAW
BY Moody and Phillips
ATTORNEYS

United States Patent Office 3,146,307
Patented Aug. 25, 1964

3,146,307

RECEIVER FOR DATA WITH ONE FREQUENCY INDICATING ONE BINARY LOGIC STATE AND ANOTHER FREQUENCY INDICATING OTHER STATE

Kenneth H. Renshaw, Costa Mesa, Calif., assignor to Collins Radio Company, Cedar Rapids, Iowa, a corporation of Iowa Filed Nov. 7, 1961, Ser. No. 150,786
9 Claims. (Cl. 178—88)

This invention relates generally to a receiver for receiving single tone data and, more specifically, is related to a receiver for receiving the single tone data generated and transmitted by the single tone data transmitter described in United States Patent 3,102,238 issued August 27, 1963, to Lynn R. Bosen entitled "Encoder With One Frequency Indicating One Binary Logic State and Another Frequency Indicating Other State."

There are in the prior art many types of transmitters and receivers for receiving and decoding a received signal. Many of these receivers are designed to receive and decode binary information which is transmitted in various forms, such as amplitude-modulated signals, phase-modulated signals, and frequency-shifted signals. In the particular invention described herein the function of the receiver is to receive and demodulate a frequency-shift keyed (FSK) signal. Generally speaking, an FSK signal is one wherein a mark, for example, is represented by frequency $f_x$, and a space is represented by another frequency $f_y$. Such information is frequently transmitted time synchronously; that is to say, each mark and each space occupies an equal interval of time, which intervals of time occur successively and usually continuously. Prior art FSK signals have consisted of a burst of several cycles of a given frequency to represent a mark or a space. At the receiver it is necessary to generate a synchronous pulse by means of which the received signal can be properly divided into its time segments, each of which represents a mark or a space. Such synchronizing signal sometimes is produced at the receiver from a synchronizing signal which is transmitted along with the intelligence-bearing signal. In other equipments the synchronizing signal is recovered from the received intelligence-bearing signal. For example, the FSK signal can be supplied to a discriminator network which produces plus or minus output signals representative of the particular frequency being received. Near the transition point between a mark and a space wherein the frequency changes, the output of the discriminator circuit will pass through zero in going from one D.C. level to another D.C. level. Such zero crossing can be employed to regenerate a synchronizing signal.

In the aforementioned patent application, Serial No. 151,700 the marks and spaces are made up of half cycles of a given frequency $f_1$, and whole cycles of another frequency $f_2$, which is twice the frequency of $f_1$. The zero crossings which occur at the output of the discriminator which is employed, do not occur at regularly spaced time intervals or multiples of regularly spaced time intervals since the frequencies of the signals representing the marks and spaces are too widely separated. It would mark a definite improvement in the art to provide a receiver means for the transmitted signal of the copending application, Serial No. 151,700, which incorporates a means for easily and faithfully reproducing a synchronizing signal.

An object of the present invention is to provide a receiver which is uniquely adapted to receive the single tone signal generated by the transmitter of the aforementioned copending application, Serial No. 151,700.

Another object of the invention is a receiver for deriving a synchronizing signal from a received single tone data signal.

A third purpose of the invention is the improvement of FSK receivers, generally.

In accordance with the invention, there is provided a means for heterodyning the received signal to a higher frequency in order to obtain better performance from a balanced discriminator which is provided to produce a positive or minus D.C. voltage in accordance with the particular frequency being received, i.e., in accordance with whether a mark or a space is being received. The output signal of the discriminator circuit is supplied to a gate circuit which is gated by sampling pulses produced by synchronizing signal generating means. The synchronizing signal generating means is comprised of a demodulator circuit which is responsive to the output of the heterodyne circuit to produce an output signal whose frequency and phase remain substantially constant with respect to the phase of the received synchronous data information, i.e., with respect to the time intervals into which the received data information is divided. The synchronizing signal generating means further comprises structure to produce from the output signal of the demodulator sampling output pulses which occur at the amplitude peaks of the output of the discriminator circuit, thus obtaining the most efficient sampling of the output signal of the discriminator circuit.

The aforementioned gating circuit is responsive to such sampling pulses and to the output of the discriminator circuit to produce a series of pulses coincidental in time with said sampling pulses and having a polarity in accordance with the output signal of said discriminator circuit. Means including toggle means are constructed to be responsive to the output of the gating circuit to produce a two-level D.C. output circuit. The particular level of said output circuit is determined by the polarity of the output pulse of the gating circuit. More specifically, for example, if a positive output pulse is supplied from the gating circuit, the toggle switch will be caused to assume a first level and will maintain said first level until a negative pulse is received from the gating circuit, at which time it will assume its second level. In this manner the original two-level signal representing marks and spaces supplied to the transmitter of the aforementioned copending application, Serial No. 151,700, is reproduced.

An important feature of the invention is that the demodulator functions not only to extract the envelope of the signal supplied thereto from the balanced heterodyne circuit, but also to perform a full-wave rectification of said envelope. The fully rectified envelope then contains positive quarter-cycle segments of $f_1$ (1200 c.p.s. signal) and half-cycle segments of $f_2$ (2400 c.p.s. signal). Such fully rectified signal contains a 2400 c.p.s. signal whose phase remains constant with respect to the unmodulated received 2400 c.p.s. signal representative of a mark, and consequently to the bit period of the received signal.

The above-mentioned and other objects and features of the invention will be more fully understood from the following detailed description thereof when read in conjunction with the drawings.

Figure 1:
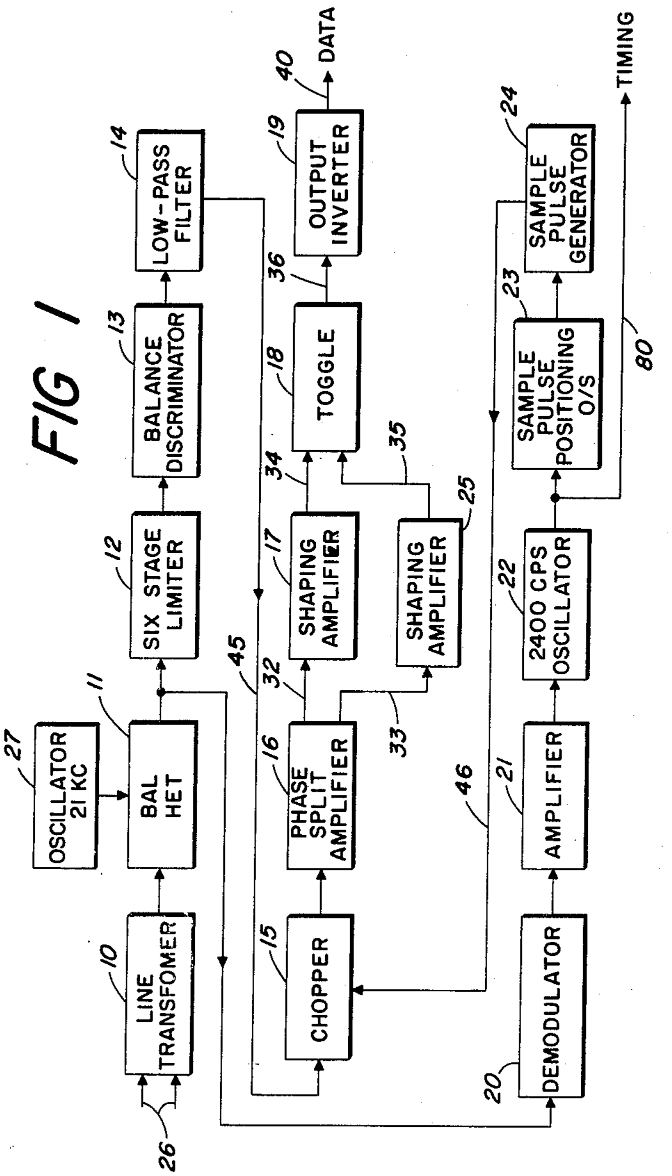
FIG. 1 shows a block diagram of the invention.
Figure 2:
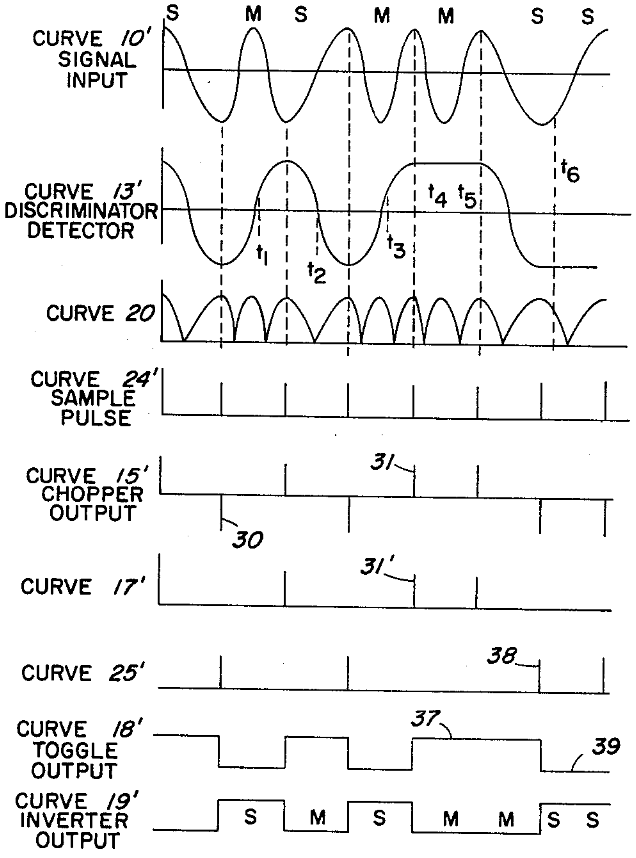
FIG. 2 shows a group of voltage waveforms which appear at various points in the circuit of FIG. 1.

Referring now to the figures, the received signal shown in curve 10' of FIG. 2 is supplied to the line transformer 10 through input leads 26. The output of the line transformer 10 is supplied to the balanced heterodyne circuit 11 wherein the output signal of the oscillator 27 functioning to heterodyne the signal to a higher frequency. In the embodiment shown in FIG. 1 the frequency of the output signal of the local oscillator is about 21 kc. Since the input signal consists of a combination of a 1200 c.p.s. signal and a 2400 c.p.s. signal, the output signal from the balanced heretodyne circuit 11 contains components having a frequency of 22.2 kc. and of 23.4 kc. There is no particular reason why the frequency of the output of the oscillator 27 must be 21 kc. Such frequency could be 25 kc., or it could be 10 kc.; the predominating factor governing the particular frequency employed being one of expediency of design. Specifically, it has been found expedient to design circuitry operable in the 22.2 to 23.4 kc. range.

The output signal of the balanced heterodyne circuit 11 is then supplied to the limiter stages 12 wherein it is insured that a constant amplitude signal is obtained over a wide range of signal-to-noise ratio of the received signal. From the limiter stages 12 the signal is supplied to a balanced discriminator 13 which has two tuned circuits therein, one of which is tuned to 1200 c.p.s. and the other which is tuned to 2400 c.p.s. To insure removal of undesirable high frequency signals above the 2400 c.p.s. range, the output signal of the balanced discriminator 131 is passed through a lowpass filter 14 and then to the chopper 15. When the 2400 c.p.s. signal which represents a mark, as can be seen from curve 10′, is being received the output signal from the low-pass filter 14 will be a positive voltage as can be seen, for example, between the times $t_1$ and $t_2$ of curve 13′ of FIG. 2. The other tuned circuit which is tuned to 2400 c.p.s. functions to produce a negative D.C. voltage at the output of the low-pass filter 14 when a space is being received, the space being represented by a half cycle of a 1200 c.p.s. signal. Such a minus D.C. voltage representing a space is shown between times $t_2$ and $t_3$ in curve 13′. It will be observed that there is a time lag between the curve 13′ and the curve 10′. The time lag interval is inherent in the discriminator. Obviously, when dealing with half cycles and single cycles of a given frequency a certain finite time is required before the discriminator can recognize the change in frequency. It can be seen from an examination of curve 13′ that the time lag is approximately half the period of a bit, the period of a bit being defined as a time duration of a mark or a space. For example, the time interval between $t_4$ and $t_5$ is a bit period. Similarly, the time interval between the times $t_5$ and $t_6$ is a bit period. It can be seen then that to obtain the best indication of whether a received bit is a mark or a space, the signal of curve 13′ should be sampled near the end of the period of the bit being sampled, as represented in curve 10′. For example, in determining the nature of the bit occurring between times $t_4$ and $t_5$ of curve 10′, the signal represented by the curve 13′ should be sampled at the end of said bit period, that is, at time $t_5$. Similarly, the nature of the bit in curve 10′ occurring between times $t_5$ and $t_6$ should be determined by sampling the signal represented by the curve 13′ at time $t_6$. The sampling pulses shown in curve 24′ are generated and synchronized to sample at such times at times $t_5$ and $t_6$, for example.

The structure for creating the sample pulses shown in curve 24′ will now be discussed.

Figure 5:
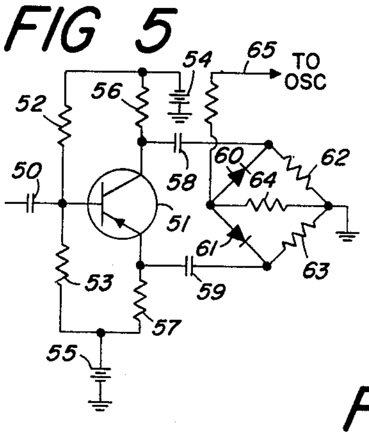
FIG. 5 shows a schematic diagram of a suitable demodulator circuit.

Referring to FIG. 5, there is shown a schematic diagram of a specific demodulator suitable for use in the block 20 of FIG. 1.

As indicated hereinbefore, the function of the demodulator 20 is to derive a 2400 c.p.s. signal from the output signal of the balanced heterodyne circuit 11 of FIG. 1, which 2400 c.p.s. signal has a constant phase with respect to the phase of the unmodulated 2400 c.p.s. signal received from the transmitter. In its operation the demodulator 20 functions to first invert the waveform of curve 10′ which is the envelope of the output of the balanced heterodyne circuit 11. It should be noted that the carrier frequency, which is not shown in curve 10′, is 21 kc. The inverted waveform is shown in curve 20 in FIG. 2 and it is in this signal that the desired 2400 c.p.s. phase reference signal exists as a component thereof. The mathematical analysis of this derivation has not been determined. However, experimentation has borne out the fact that such a constant phase signal is contained in the signal produced at the output terminals of the structure of FIG. 5.

Figure 3:
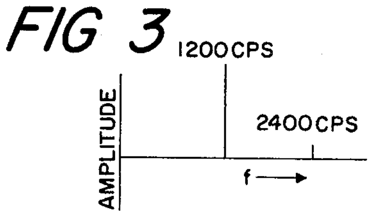
FIGS. 3 and 4 show frequency distribution charts.
Figure 4:
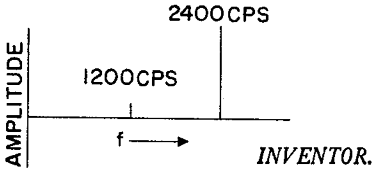

Looking at FIG. 3, there is shown a frequency spectrum of a signal in which the primary frequency is 1200 c.p.s. and the harmonic of 2400 c.p.s. is also present. In FIG. 4 there is shown a frequency spectrum in which the fundamental frequency is 2400 c.p.s. with a subharmonic of 1200 c.p.s. The frequencies in FIGS. 3 and 4 beat against one another to produce a frequency spectrum consisting of harmonics beginning at 1200 c.p.s. and going up in multiples thereof.

In FIG. 4 it will be observed that the 1200 c.p.s. subharmonic is a lower frequency than the 2400 c.p.s. fundamental. Ordinarily, this is not a natural phenomenon. Consequently, to obtain such a subharmonic in the receiver the transmitted 2400 c.p.s. signal is slightly amplitude modulated (about 5% modulation). Such modulation provides the basis for deriving the 1200 c.p.s. subharmonic from the received signal. Without such amplitude modulation of the transmitted signal, the subharmonic of 1200 c.p.s. with a fundamental of 2400 c.p.s. would be very small, perhaps, even nonexistent. In any event, it might be insufficient to insure that the desired, constant phase 2400 c.p.s. signal could be derived from the rectified waveform of curve 20. As indicated above, FIG. 5 shows a diagram of the particular circuit which may be used in demodulator block 20. The input signal is taken from the output signal of the balanced heterodyne circuit 11 of FIG. 1 and is supplied via capacitor 50 to the base of transistor 51. Resistors 52 and 53 are connected across minus 15-volt battery source 54 and plus 15-volt battery source 55 to provide a bias for the base of the transistor 51. Output signals are taken from the emitter and the collector electrodes of transistor 51, said output signals being of opposite phases; that is to say, the transistor 51 with its collector and emitter resistors 56 and 57 functions as a phase-splitting device. The two output signals are supplied through capacitors 58 and 59 to the full-wave rectifier consisting of diodes 60 and 61, loading resistors 62 and 63, and resistor 64 which provides a D.C. path to ground to prevent a negative voltage from building up between the diodes 60 and 61. More specifically, the diode 60 functions to provide rectification for the negative half cycles appearing at the output of the collector electrode, and the diode 61 functions to provide rectification for the negative half cycles appearing at the emitter electrode. Since the signals appearing at the collector and emitter electrode are, however, 180° out of phase with respect to each other, this amounts to a full rectified signal appearing on the output lead 65, which lead is connected to amplifier 21 of FIG. 1.

It is to be noted that full-wave rectifiers, other than the one shown in FIG. 5, may be employed in the invention. The important thing is that the output signal from the balanced heterodyne circuit 11 of FIG. 1 is fully rectified.

Thus, there is produced at the output of the demodulator 20 an output signal containing a component having a frequency of 2400 c.p.s. and a phase that is constant with respect to the bit periods of the received signal, as shown in curve 10′. Such 2400 c.p.s. signal is amplified by the amplifier 21 and supplied as a driving input signal to the 2400 c.p.s. oscillator 22 which, in response thereto, generates a square wave output whose phase is determined by the phase of the applied input signal. It is to be noted that the output signals of the amplifier 21 and the 2400 c.p.s. oscillator 22 are not shown in the curves of FIG. 2.

It is usually necessary to alter the phase of the 2400 c.p.s. oscillator somewhat in order to produce a sampling pulse signal which occurs at the optimum time, such as the times $t_4$, $t_5$, and $t_6$ of curve 13'. Such shifting of the phase of the output signal of the oscillator 22 is accomplished by delay means 23. The output of delay means 23 is a square wave whose phase has been shifted with respect to the output signal of oscillator 22. The sample pulse generator 24 responds to the square wave output signal of delay means 23 to produce a series of pulses, such as shown in the curve 24' of FIG. 2. As can be seen from the curve 24', these pulses occur at the optimum time with respect to the curve 13'. Gate 15 is constructed to receive on lead 45 the signal shown in curve 13' and also on lead 46, the sampling pulses shown in curve 24' and, further, is constructed to produce a series of output pulses, such as shown in curve 15'. Such output pulses occur coincidentally with the sampling pulses of curve 24' and have a polarity determined by the polarity of the curve 13' at the time of sampling. Thus, the pulse 30 of curve 15' is negative since the waveform of 13' is negative at that time. Similarly, the pulse 31 of curve 15' is positive since the curve 13' is positive at that time. The output of the gating circuit, as shown in curve 15', is then supplied to a phase-splitting amplifier 16, which functions to separate the positive and the negative pulses in a well-known manner, the positive pulses being supplied to the output terminal 32 thereof and the negative pulses being supplied to the output terminal 33 thereof. Such positive and negative pulses are then supplied to shaping amplifiers 17 and 25, respectively, wherein the said pulses are shaped to provide sharper pulses. The output signals from the shaping amplifiers 17 and 25 are then supplied to a toggle switch 18 which is a bistable device constructed to produce a two-level D.C. output signal; the level of the D.C. output signal being determined by the condition of the toggle device. For example, a positive pulse supplied to the toggle switch through input conductor 34 will function to produce a high level output signal at the output terminal 36 of the toggle switch 18. Thus, the pulse 31' of curve 17' will produce the high level condition 37 shown in curve 18'. A positive pulse, such as positive pulse 38 of curve 25', supplied to input conductor 35 of the toggle switch 18 will cause the toggle switch to assume its low-level condition as indicated by portion 39 of curve 18'.

The curve 18' is now in inverted reproduction of the original data input signal supplied to the encoder of the transmitter described in the aforementioned copending application, Serial No. 151,700. To invert the waveform 18' to its proper form, the output inverter 19 is employed in the output circuit of toggle switch 18. The data appearing on lead 40 is represented by the curve 19' which is a reproduction of the input data originally supplied to the transmitter of United States Patent No. 3,102,238 mentioned hereinbefore.

It should be noted that the output signal of the oscillator 22 can be employed as a timing pulse source for other data processing equipment associated with the equipment shown and described herein. Such timing pulses can be supplied to such other equipment via lead 80.

It is to be noted that the form of the invention shown and described herein is but a preferred embodiment thereof and that various changes may be made in the block diagram arrangement and in the specific details of the schematic diagrams shown herein without departing from the spirit or the scope of the invention.

I claim:

1. Decoding means for decoding a received bit synchronous signal in which each data bit contains either a half cycle of a substantially sine wave shaped first signal having a frequency $f_1$ or a whole cycle of sine wave shaped signal having a frequency $2f_1$ of the same peak amplitude as said first signal and in which each bit begins and ends at a peak amplitude of the data representing signal contained therein, said decoding means comprising discriminator means for producing an output signal whose polarity varies in accordance with change in frequency of the received encoded signal, demodulator means including a full-wave rectifier responsive to the received bit synchronous signal to produce a demodulated and full wave rectified output signal, oscillator means responsive to the output signal of said demodulator means to produce an output signal having a frequency $2f_1$ and having a phase which remains constant with respect to the phase of the bit period of the received bit synchronous signal, first pulse-forming means constructed to derive a first pulsating signal from the output signal of said oscillator means having a repetition rate $2f_1$ and occurring substantially with the occurrence of the peak amplitudes of the output signal of said discriminator means, second pulse-forming means responsive to said discriminator means output signal and said pulsating signal to produce a two-level bit synchronous signal containing the information contained in the received encoded signal.

2. Decoding means in accordance with claim 1 in which said second pulse-forming means comprises a gating means for gating said discriminator means output signal with said first pulsating signal to produce a second pulsating signal having a repetition rate equal to that of the first pulsating signal with each pulse of said second pulsating signal having a polarity determined by the polarity of the discriminator means output signal at the time of occurrence of each said pulse, and encoding means including bistable means responsive to said second pulsating signal to produce a bit synchronous two-level output signal whose transition times are determined by the repetition rate of said second pulsating signal.

3. A decoding means in accordance with claim 2 in which said oscillator means is constructed to produce a square wave output signal and in which said first pulse-forming means comprises a delay means to delay the output signal of said oscillator means a desired amount, and pulse generating means responsive to the output signal of said delay means to produce said first pulsating signal.

4. A decoding means in accordance with claim 2 in which said encoding means comprises a means for separating pulses of different polarity contained in the said second pulsating signal, and in which said bistable means is responsive to said separated pulses to produce said two-level output signal.

5. A decoding means in accordance with claim 4 in which said oscillator means is constructed to produce a square wave output signal and in which said first pulse-forming means comprises a delay means to delay the output signal of said oscillator means a desired amount, and pulse generating means responsive to the output signal of said delay means to produce said first pulsating signal.

6. A decoding means in accordance with claim 1 comprising oscillator means and balanced heterodyning means for heterodyning the received encoded signal to a higher frequency, in which said demodulator means is responsive to the output signal of said heterodyning means and in which said discriminator means comprises a balanced discriminator, and comprising a low-pass filter for filtering the output signal of said discriminator means.

7. Decoding means in accordance with claim 6 in which said second pulse-forming means comprises a gating means for gating said discriminator means output signal with said first pulsating signal to produce a second pulsating signal having a repetition rate equal to that of the first pulsating signal with each pulse of said second pulsating signal having a polarity determined by the polarity of the discriminator means output signal at the time of occurrence of each said pulse, and encoding means including bistable means responsive to said second pulsating signal to produce a bit synchronous two-level output signal whose transition times are determined by the repetition rate of said second pulsating signal.

8. A decoding means in accordance with claim 7 in which said oscillator means is constructed to produce a square wave output signal and in which said first pulse-forming means comprises a delay means for delaying the output signal of said oscillator means a desired amount, and pulse generating means responsive to the output signal of said delay means to produce said first pulsating signal.

9. A decoding means in accordance with claim 8 in which said encoding means comprises a means for separating pulses of different polarity contained in the said second pulsating signal, and in which said bistable means is responsive to said separated pulses to produce said two-level output signal.

References Cited in the file of this patent

UNITED STATES PATENTS 2,939,914 Ingham ---------------- June 7, 1960